United States Patent [19]

Garnett

[11] 4,051,804
[45] Oct. 4, 1977

[54] THAW-INDICATOR DEVICE
[75] Inventor: Merrill Garnett, East Islip, N.Y.
[73] Assignee: Garnett-McKeen Chemical Corporation, East Islip, N.Y.
[21] Appl. No.: 662,533
[22] Filed: Mar. 1, 1976
[51] Int. Cl.² .......................................... G01K 11/00
[52] U.S. Cl. ................................. 116/114.5; 426/88
[58] Field of Search .... 116/114 V, 114 AJ, DIG. 41, 116/114.5; 73/358, 356; 24/19; 206/219; 426/88

[56] References Cited
U.S. PATENT DOCUMENTS

| 2,560,537 | 7/1951 | Andersen | 116/114 V X |
| 2,662,018 | 12/1953 | Smith | 73/358 |
| 3,257,072 | 6/1966 | Reynolds | 206/219 |
| 3,521,489 | 7/1970 | Finkelstein et al. | 73/358 |

Primary Examiner—Richard C. Queisser
Assistant Examiner—Daniel M. Yasich
Attorney, Agent, or Firm—Nims, Howes, Collison & Isner

[57] ABSTRACT

Thaw-indicator for frozen articles including a V-shaped transparent elastomeric tube having its inner wall surfaces disposed in liquid tight interfacial engagement at the apex of the V by a removable band and defining a pair of closed liquid containers, adapted to contain freezable contrasting liquid dyes.

4 Claims, 3 Drawing Figures

THAW-INDICATOR DEVICE

The present invention relates to thaw-indicators for frozen foods and the like and more particularly to an improved construction for indicating an undesired thawing of frozen articles by color change.

Thaw-indicators serve the important purpose of providing a positive indication of whether a frozen article, such as a frozen food, has become thawed subsequent to the time of its initial freezing. Usage of such thaw-indicator devices are generally limited only by their ability to withstand temperatures which will cause deterioration of the materials employed therein.

Conventional constructions for thaw-indicators which utilize meltable liquids or the like to produce a color change indicative of undesired thawing have generally included dissolvable or rupturable separating walls or partitions that are adapted to rupture at the time when the second of two liquid components has become fully frozen. In such constructions when melting later occurs in the presence of a ruptured separating partition, the liquids are free to intermingle to provide a visible color change. Such type construction requires utilization of partition wall materials of a character that can withstand sterilization temperature and which are adapted to selectively rupture only in response to the expansion of one of the contained liquids that is attendant the freezing thereof. Accordingly, this separating or partition wall generally is not constituted of the same material as that used as the body of the indicator device or must be physically constituted to provide the desired result at the particular temperature involved.

The required criticality of the physical and chemical characteristics of the material employed in accord with temperature, the use of differing component materials, the required inspection subsequent to fabrication to insure the presence of partition wall rupture and limitations in operable temperature ranges have not only rendered such conventionally constructed devices relatively costly but have limited the fields of potential use thereof.

This invention may be briefly described as an improved construction for a thaw-indicator that includes, in its broad aspects, a V shaped tube of elastomeric material defining a pair of discrete closed end freezable indicating liquid containers separated by the liquid tight interfacial engagement of the tube walls at the apex of the V, discrete freezable indicating liquids disposed within said closed end containers of a character to visually indicate liquid intermixture thereof, and removable means for maintaining said liquid tight interfacial engagement of said tube walls at the apex of said V preparatory to and during the freezing of said indicating liquids.

Among the advantages of the subject indicator is the provision of a simple and inexpensive construction for a thaw-indicator that is essentially free of critical temperature and material parameters characteristic of conventional constructions. Another advantage is the provision of a thaw-indicator device construction that may be stored for extended periods of time and subjected to repeated thaw-freezing cycles preparatory to final usage thereof and is thus insensitive to storage and handling environment preparatory to intended use thereof.

The primary object of this invention is the provision for an improved construction for thaw-indicating devices.

Another object of the present invention is the provision for thaw-indicating devices of relatively low cost and extreme durability capable of withstanding harsh handling and extended periods of storage without temperature criticality prior to use thereof.

Figure 1:
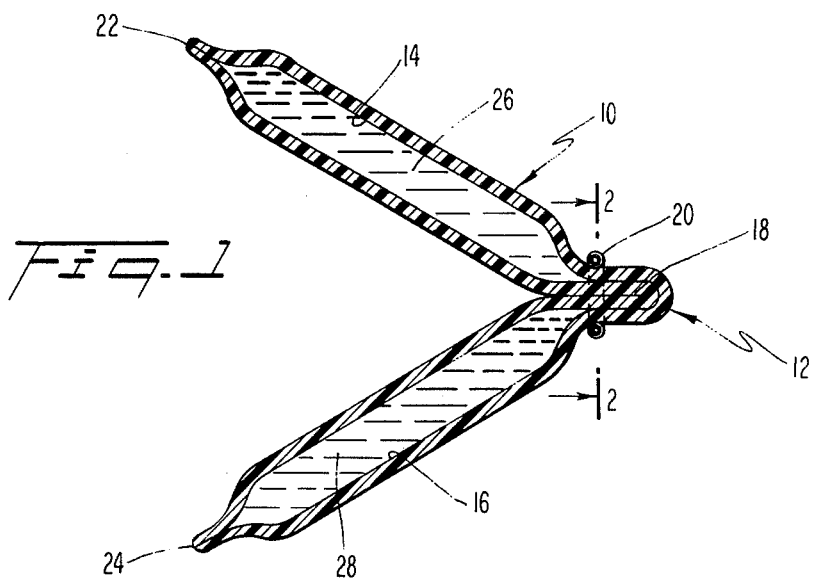
FIG. 1 is a side view, partially in section, of a thaw-indicator constructed in accord with the principle of this invention.
Figure 2:
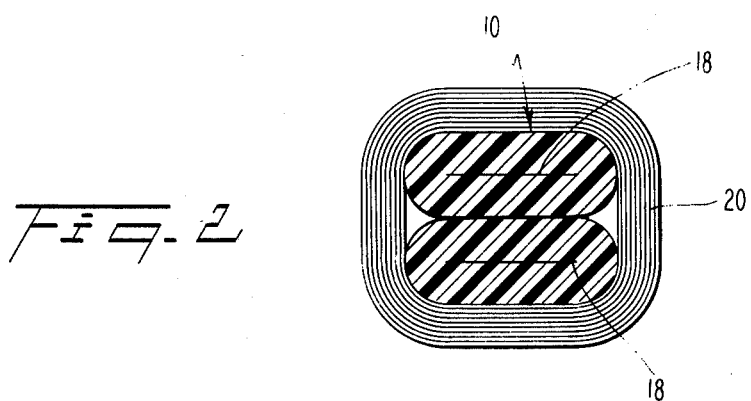
FIG. 2 is an enlarged sectional view as taken on the line 2—2 of FIG. 1.

Referring to the drawings there is provided an elongate tube 10 of transparent elastomeric material doubled or folded back upon itself at about its midlength, as at 12, to form a V shaped element having a spaced pair of liquid containing portions 14 and 16 respectively. As shown the inner walls of the tube 10 are disposed in liquid tight interfacial relation, as at 18, at and adjacent to the fold line or apex of the "V" and are adapted to be maintained in such liquid tight interfacial relation by a removable band 20, such as a small metal clip or elastic band or the like. The terminal ends of the tube 10 are closed as shown at 22 and 24 respectively by compression heat sealing or other closing means to thus define the pair of closed end discrete and isolated liquid containable chambers or portions 14 and 16 respectively.

Disposed within the liquid containable chambers 14 and 16 are discrete freezable liquids 26 and 28 containing dye or other constituents that will provide a marked color variation upon intermingling thereof.

A suitable and presently preferred elastomeric material for the tube 10 comprises a modified polyvinyl tubing commercially available under the name Tygon. Tygon is a transparent, tasteless, non-toxic and non-contaminating material of excellent chemical resistance that maintains extreme flexibility within the temperature range of minus 20° F. to plus 200° F., with a brittle point of about −50° F.

In the fabrication of the subject device an open ended piece of tubing 10 of approximate three inch length is folded into a V shape and the removable band 20 is placed over the folded apex to maintain the interfacially engaged inner tube surfaces in liquid tight relation. Into each of the open ended chambers 14 and 16 as now formed is poured a different colored liquid dye suitably either certified vegetable coloring or U.S. certified food coloring, diluted about a 1,000 fold with water and subsequently sterilized by microfiltration. The liquid dye colors are of a character to provide a pronounced color change upon intermixture thereof, as for example, but not limited to, yellow and blue. After introduction of the liquid dyes, the open ends of the chambers 14 and 16 are sealed by conventional heat and compression methods employed for sealing polyvinyl tubing.

With the device so assembled, leakage at the V bend will be readily apparent by color change resulting from liquid intermixture. Absent any indicated leakage the device is now ready for sale and usage with or without any intermediate extended storage. As is apparent, leakage at any time prior to use will be readily apparent by a color change.

The first step in the use of the device as a thaw-indicator is to freeze the liquids 26 and 28 disposed within the chambers 14 and 16. At anytime after the liquid dyes 26 and 28 have become solidified, which will normally occur well above the −50° F. embrittlement temperature of the Tygon tubing, the band 20 can be removed.

Figure 3:
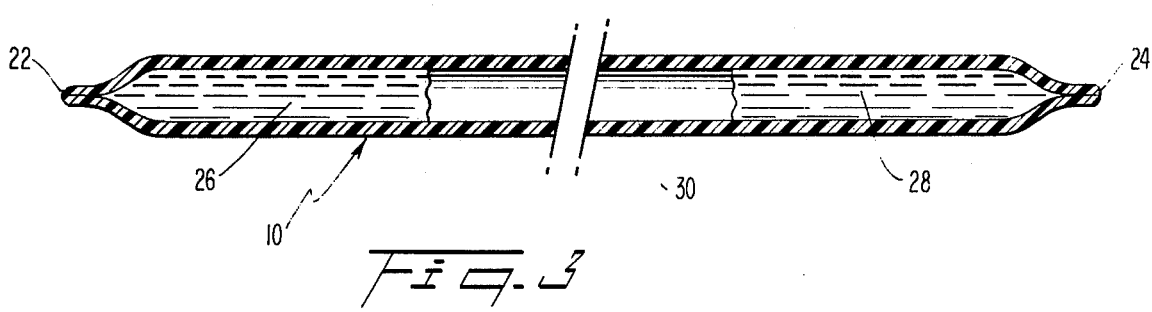
FIG. 3 is a side view in section of the device of FIG. 1 in its unfolded condition.

Upon band removal, the tube 10 is straightened out to elongate form as illustrated in FIG. 3. As there shown, the frozen liquids 26 and 28 will be separated by a gap 30. The straightened device as shown in FIG. 3 may now be placed in proximity with the items whose possible subsequent thawing is to be sensed. For example, the device can be affixed to or placed within the food package or just placed adjacent to the articles in the freezer.

If undersired thawing occurs, the frozen liquid dyes 26 and 28 will at least partially melt and the resulting liquids will commingle in the gap 30, producing a green color. The amount of green colorant, as compared to the remaining blue and yellow frozen dyes, provides a rough indication of the degree of thawing.

After use and thawing, the indicator may be discarded since its low manufacturing cost and consequential low sale price allows one to economically purchase this item for single usage. If desired and still in the frozen state, the unit can be refolded, the band replaced and the unit ultimately reused.

It should be noted that if the band 20 is not removed even after the dyes have frozen the device is in condition to be used at any time and over again. Accordingly, if freezing has commenced such can be interrupted at any time without loss which is a distinct advantage in large scale manufacturing or packaging operations. Thus, in short, as long as the band 20 is not removed, freezing of the dyes in the device and their subsequent thawing without any commingling can occur innumerable times.

Having thus described my invention I claim:

1. An improved thaw-indicating device for frozen articles comprising an elongate transparent elastomeric tube folded into a V shaped to define first and second discrete closed end liquid containers separated by liquid tight interfacial engagement of the interior tube wall surfaces at the apex of the V, first and second liquid dyes for producing a contrasting color upon intermixture thereof selectively contained in said first and second closed end containers and means for selectively maintaining said liquid tight interfacial tube wall surface engagement temporarily at the apex of the V.

2. An improved thaw-indicator device, as set forth in claim 1, wherein the elastomeric tube comprises polyvinyl tubing.

3. An improved thaw-indicating device, as set forth in claim 1, wherein said means for maintaining said liquid tight interfacial tube wall engagement at the apex of the V comprises a band sized to encircle the folded tube and maintain the folded V shape thereof.

4. An improved thaw-indicating device, as set forth in claim 3, wherein said band is removable.

* * * * *